United States Patent
Eckert

(10) Patent No.: US 10,681,440 B2
(45) Date of Patent: Jun. 9, 2020

(54) MOUNTING SYSTEM FOR AN ENCLOSURE, IN PARTICULAR FOR A LOUDSPEAKER

(71) Applicant: Adam Hall GmbH, Neu-Anspach (DE)

(72) Inventor: Mario Eckert, Rockenberg (DE)

(73) Assignee: Adam Hall GmbH, Neu-Anspach (DE)

( * ) Notice: Subject to any disclaimer, the term of this patent is extended or adjusted under 35 U.S.C. 154(b) by 228 days.

(21) Appl. No.: 15/873,504

(22) Filed: Jan. 17, 2018

(65) Prior Publication Data
US 2018/0206015 A1 Jul. 19, 2018

(30) Foreign Application Priority Data
Jan. 17, 2017 (DE) .................... 20 2017 100 219 U

(51) Int. Cl.
*H04R 1/02* (2006.01)
*H04R 1/28* (2006.01)
*F16B 5/06* (2006.01)

(52) U.S. Cl.
CPC .............. *H04R 1/026* (2013.01); *H04R 1/28* (2013.01); *F16B 5/0664* (2013.01); *H04R 2201/021* (2013.01); *H04R 2201/025* (2013.01); *H04R 2201/029* (2013.01)

(58) Field of Classification Search
CPC .......... H04R 1/026; H04R 1/28; H04R 1/403; H04R 2201/021; H04R 2201/025; H04R 2201/029; H04R 2499/13
USPC ................ 381/87, 334, 152, 386, 387, 395; 248/278.1, 284.1, 288.11, 289.11; 379/454
See application file for complete search history.

(56) References Cited

U.S. PATENT DOCUMENTS

| | | | |
|---|---|---|---|
| 5,109,411 A * | 4/1992 | O'Connell | B60R 11/0241 224/553 |
| 6,244,553 B1 * | 6/2001 | Wang | B60R 11/02 248/278.1 |
| 8,020,823 B2 * | 9/2011 | Wang | F16M 11/12 248/278.1 |
| 2013/0327912 A1 * | 12/2013 | Yoshida | F16M 13/022 248/289.11 |

* cited by examiner

*Primary Examiner* — Huyen D Le
(74) *Attorney, Agent, or Firm* — Nelson Mullins Riley & Scarborough LLP; Kongsik Kim, Esq.

(57) ABSTRACT

The present invention relates to a mounting system (1), preferably for a loudspeaker enclosure, with an X-axis, a Y-axis and a Z-axis being defined that are respectively perpendicular to each other, comprising a support (2) having a first form-fit element (4) and a locking pin (6), and an enclosure (12) to be suspended with a second form-fit element (16) and a pin recess (18), wherein the two form-fit elements (4, 16) are insertable into each other along the X-axis for a locking state, and wherein the locking pin (6) engages in the pin recess (18) in the locking state, to block a relative movement between the support (2) and the enclosure (12) along the X-axis.

20 Claims, 8 Drawing Sheets

MOUNTING SYSTEM FOR AN ENCLOSURE, IN PARTICULAR FOR A LOUDSPEAKER

CROSS-REFERENCE TO RELATED APPLICATION

This application claims priority to and the benefit of German Utility Model Application No. 202017100219.5 filed on Jan. 17, 2017, the entire contents of which are incorporated herein by reference.

TECHNICAL FIELD

The invention relates to a mounting system for an enclosure. The enclosure is particularly a loudspeaker enclosure. The enclosure is particularly mounted by means of the mounting system to a cross member or to a similar structure.

RELATED ART

DE 20 2008 003 376 U1 shows a previously known solution for suspending of loudspeakers, wherein the handles at the loudspeaker enclosures are used for suspending.

SUMMARY

It is an object of the invention to provide a mounting system for an enclosure that allows a rapid and simple assembly and a secure mounting of an enclosure to a superimposed structure.

The solution of this object is achieved by the features of the independent claims. The dependent claims contain advantageous developments of the invention.

Thus, the object is solved by a mounting system. The mounting system is preferably used for a loudspeaker enclosure. However, the mounting system can also be used for other enclosures, particularly in the field of event technology. In this way, for example, also lighting systems can be mounted to the mounting system. Particularly, a mounting system can be used to suspend a corresponding enclosure to a superimposed structure. This superimposed structure is, for example, a cross member, how it is used particularly in the stage technology.

In order to explain the mounting system, there are defined an X-axis, a Y-axis and a Z-axis that are respectively perpendicular to each other. If the enclosure is mounted at its upper side, then the upper side of the enclosure is particularly provided parallel to the X-axis and Z-axis. For example, if the enclosure is mounted at its backside, then the backside of the enclosure is particularly provided parallel to the X-axis and Z-axis.

The mounting system includes a support with at least a first form-fit element and a locking pin. The support is mounted to the enclosure by means of a first form-fit element. The locking pin is engaged with the enclosure and makes sure that the support and the enclosure do not release from each other. The support, in turn, can be mounted to the superimposed structure in order to suspend the enclosure.

Further, the mounting system includes the enclosure with a second form-fit element integrated therein as well as a pin recess for the locking pin. Particularly, the enclosure includes an associated second form-fit element for each first form-fit element of the support. Overall, a locking pin is at least provided with an associated pin recess in order to block a releasing of the form-fit elements. For convenience, the invention is described in the following mostly based on a first form-fit element at the support and a second form-fit element at the enclosure. When used with a plurality of first form-fit elements and associated second form-fit elements, it is particularly provided that all first form-fit elements and all second form-fit elements, respectively, are of the same form.

In a locking state of the support and the enclosure, the first form-fit element and the second form-fit element are meshing, so that the support and the enclosure are connected form-fittingly to each other. The two form-fit elements are formed, so that they are insertable into each other for forming this locking state along the X-axis. For the locking state, the support and the enclosure are thus moved, preferably linear, relative to each other along the X-axis. In order to release the support and the enclosure from each other again, both elements are moved in the opposite direction along the X-axis.

The locking pin at the support and the pin recess at the enclosure are formed so that the locking pin engages into the pin recess as soon as the locking state is achieved. In the engaged state the locking pin is in the pin recess and thus blocks a relative movement between the support and the enclosure along the X-axis, with the two form-fit elements remaining in their locking state.

In particular, the first form-fit element is a rigid and immovable part of the support, so that the first form-fit element can be moved only together with the support and the locking pin arranged thereon. When several first form-fit elements are provided, thus all first form-fit elements are rigid and immovable parts of the support and they can be moved only together. The first form-fit elements are thus no parts arranged moveable at the support.

The second form-fit element is particularly a rigid and immovable part of the enclosure, so that the second form-fit element can be moved only together with the enclosure. When several second form-fit elements are provided, thus all second form-fit elements are rigid and immovable parts of the enclosure and can be moved only together.

The enclosure comprises preferably a pocket. The pocket is formed particularly by an insert, which is inserted into the wall of the enclosure. The wall of the enclosure can be formed out of any material, for example wooden plates. The loudspeakers are, for example, within the wall. The insert is formed particularly out of metal and is located preferably at the upper side or the backside of the enclosure.

The second form-fit element is preferably in the pocket and/or is at least formed partly by the pocket. As still described in detail, there is, for example, a bolt in the pocket, which is surrounded by the first form-fit element. This bolt in the pocket provides a form-fitting connection regarding the relative movement along the Y-axis. The first form-fit element is between the sidewalls of the pocket within the pocket, so that the sidewalls of the pocket are housing the first form-fit element regarding the relative movement along the Z-axis. In this way, the second form-fit element may be arranged in the pocket, depending on the form of the pocket, and/or can be formed at least partly by the pocket.

In particular, the pocket comprises a slot-shaped opening. The slot-shaped opening is located in the plane built up by the X-axis and Z-axis. For connecting the support with the enclosure, the first form-fit element is inserted through the opening into the pocket along the Y-axis first. This state, in which the first form-fit element is in the pocket, however not yet engaged with the second form-fit element, is indicated as an "intermediate state". As soon as the first form-fit element is in the pocket and thus in the intermediate state, the relative movement along the X-axis can be implemented for establishing the locking state. The two form-fit elements are thus insertable into each other along the X-axis.

The pin recess at the enclosure is particularly a gap, which is open in the X-Z-plane, so that the locking pin can be engaged into the pin recess on this open side. The pocket is also used particularly preferably as a pin recess. Alternatively, the enclosure may comprise a separate gap as a pin recess, into which the pin is engaged in the locking state.

It is preferably provided, that the second form-fit element includes a bolt extending along the Z-axis within the pocket. Both ends of the bolt are mounted particularly to or in opposite walls of the pocket. The first form-fit element is preferably formed in a shape of a hook. In the locking state, the bolt is seated on the hook. The connection between a bolt and a hook in the pocket creates a form-fitting connection regarding the relative movement in both directions along the Y-axis. The direction along the X-axis is also blocked by the connection between a bolt and a hook. The other direction along the X-axis is blocked by the locking pin. The sidewalls of the pocket block the first form-fit element regarding the relative movement along the Z-axis.

The locking pin is preferably mounted in a linearly moveable manner to the support. Particularly, the locking pin is thus linearly moveable only along one axis, preferably the Y-axis. The locking pin is displaceable between an engaged state and a disengaged state. In the disengaged state the locking pin extends into the pin recess of the enclosure.

It is particularly preferably provided that the locking pin projects through a hole in the support. The locking pin is mounted to this hole by means of a mounting sleeve. There is particularly preferably provided an elastic element, particularly a spring. This elastic element biases the locking pin in the direction of its engaged state.

As described above, it is preferably provided that the first form-fit element is inserted into the pocket along the Y-axis and is in an intermediate state within the pocket at first, before both form-fit elements are inserted into each other by the movement along the X-axis. The locking pin is preferably arranged so that it abuts with the enclosure when the first form-fit element is inserted into the pocket along the X-axis. The locking pin is pushed into its engaged state by the movement along the X-axis. During the movement of the first form-fit element along the X-axis, the locking pin slides on the enclosure in its engaged state. As soon as both form-fit elements insert to each other, the locking pin disengages and projects into the pin recess.

The support includes preferably a retaining device for mounting the support to a superimposed structure. This superimposed structure involves, for example, a cross member how it is used in the field of event technology, for example on stages.

The invention includes further an enclosure, preferably a loudspeaker enclosure, for the use of the described mounting system. At the enclosure, there is at least a second form-fit element and at least a pin recess for the locking pin.

It is particularly preferably provided that the second form-fit element is embedded in the wall of the enclosure. As described above, the second form-fit element can be at least formed partly by a pocket. This pocket is particularly embedded in the wall of the enclosure. The pocket preferably particularly flushes with the surface of the wall.

The invention includes further a support for the use of the described mounting system. The support includes at least a first form-fit element and at least a locking pin. The support is preferably made of a metal sheet.

The at least one first form-fit element is preferably formed by a bent section of the metal sheet. A main body of the support is particularly preferably formed by the metal sheet. The main body extends in the X-Z-plane. The one or the first form-fit elements are bent out of this plane and project in the direction of the enclosure along the Y-axis. Two or four of the first form-fit elements and at least one, preferably at least two, locking pin(s) are particularly preferably at the main body.

BRIEF DESCRIPTION OF THE DRAWINGS

Further details, features and advantages of the present invention will become clear from the following description of an exemplified embodiment based on the attached drawing, in which.

DETAILED DESCRIPTION

Figure 1:
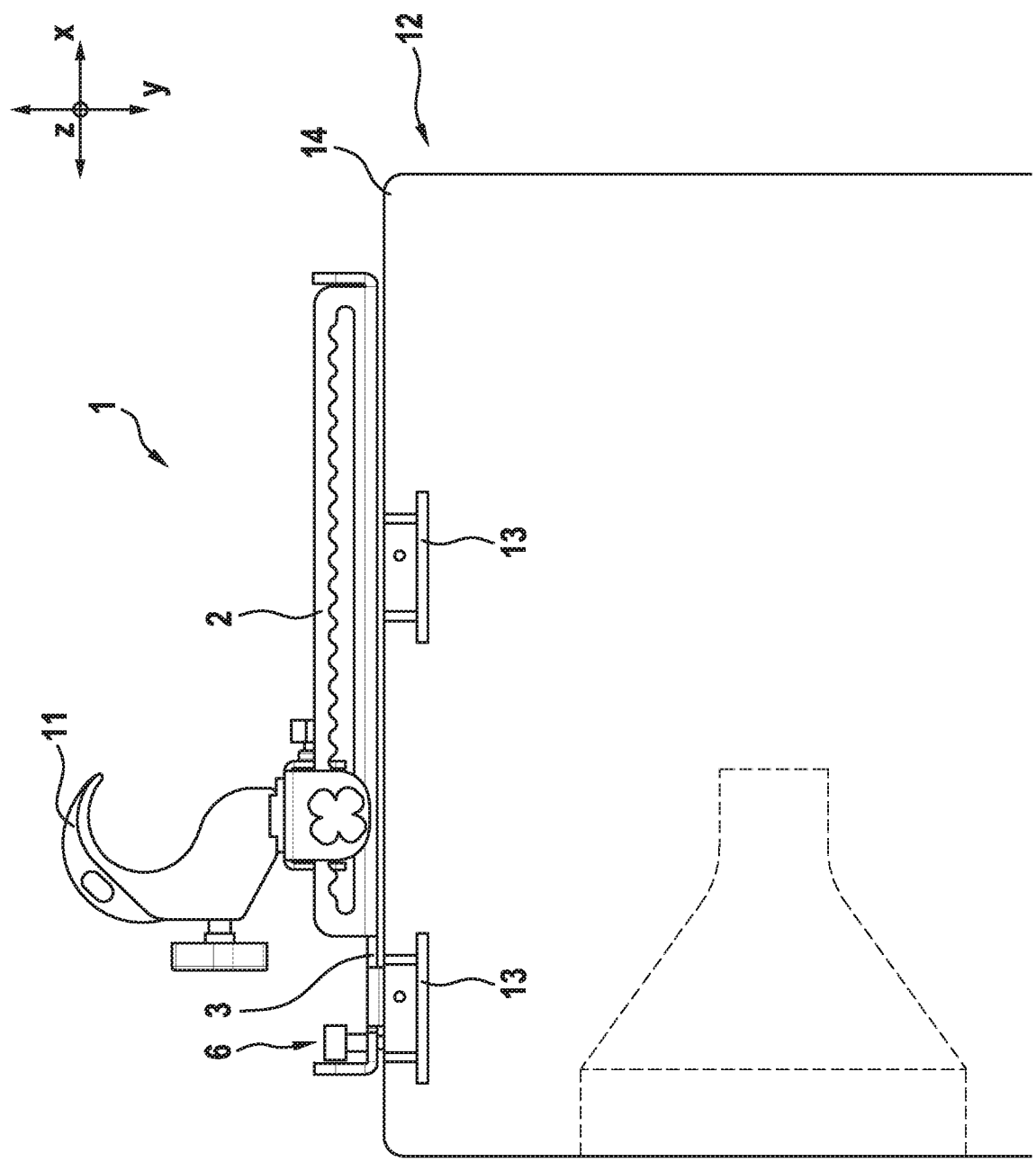
FIGS. 1-4 show different views of the mounting system according to the present invention.
Figure 2:
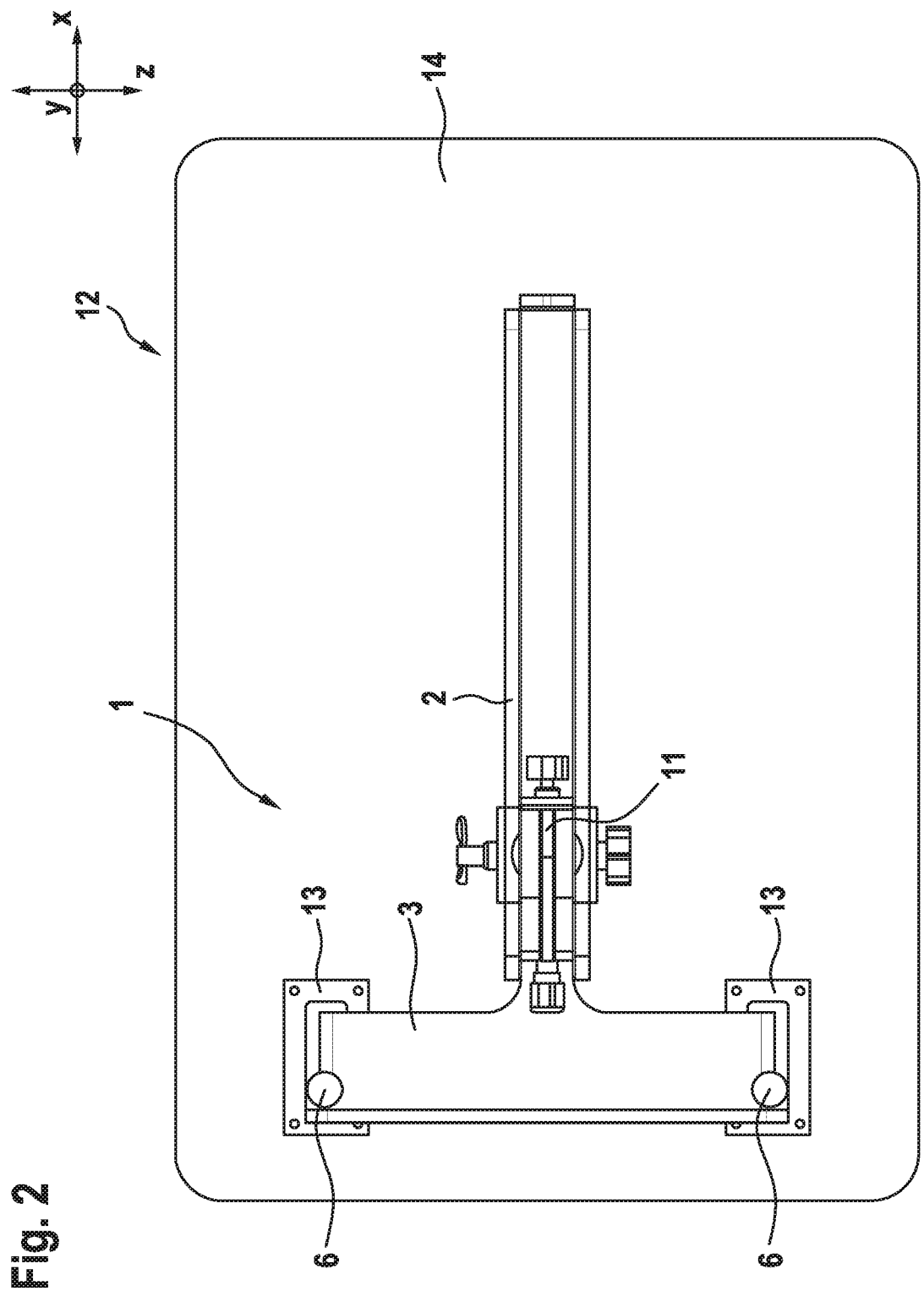
Figure 3:
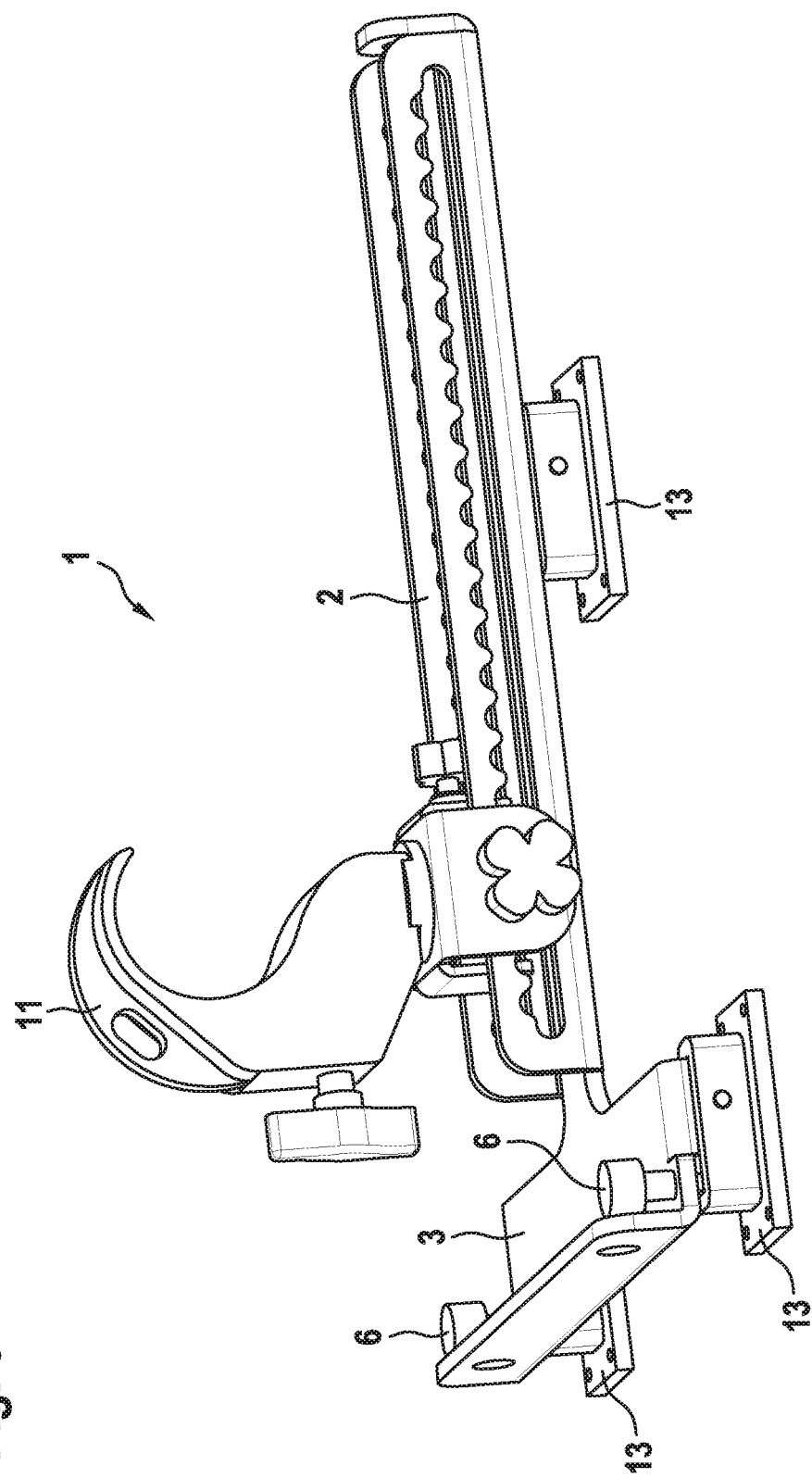

In the following the mounting system 1 according to the present invention is explained in detail with reference to FIGS. 1 to 8.

In the example shown, the mounting system 1 is used for suspending an enclosure 12 formed as a loudspeaker enclosure, at its upper side. The mounting system 1 includes a support 2 for this purpose. The retaining device is at the support 2. The support 2 can be mounted to a superimposed structure by means of the retaining device 11.

As shown in FIGS. 1 to 7, the support 2 includes a main body 3, particularly made of metal sheet. The main body 3 extends basically with the X-Z-plane and thus parallel to the upper side of the enclosure 12. Three first form-fit elements 4 extend from the main body 3 along the Y-axis.

Figure 4:
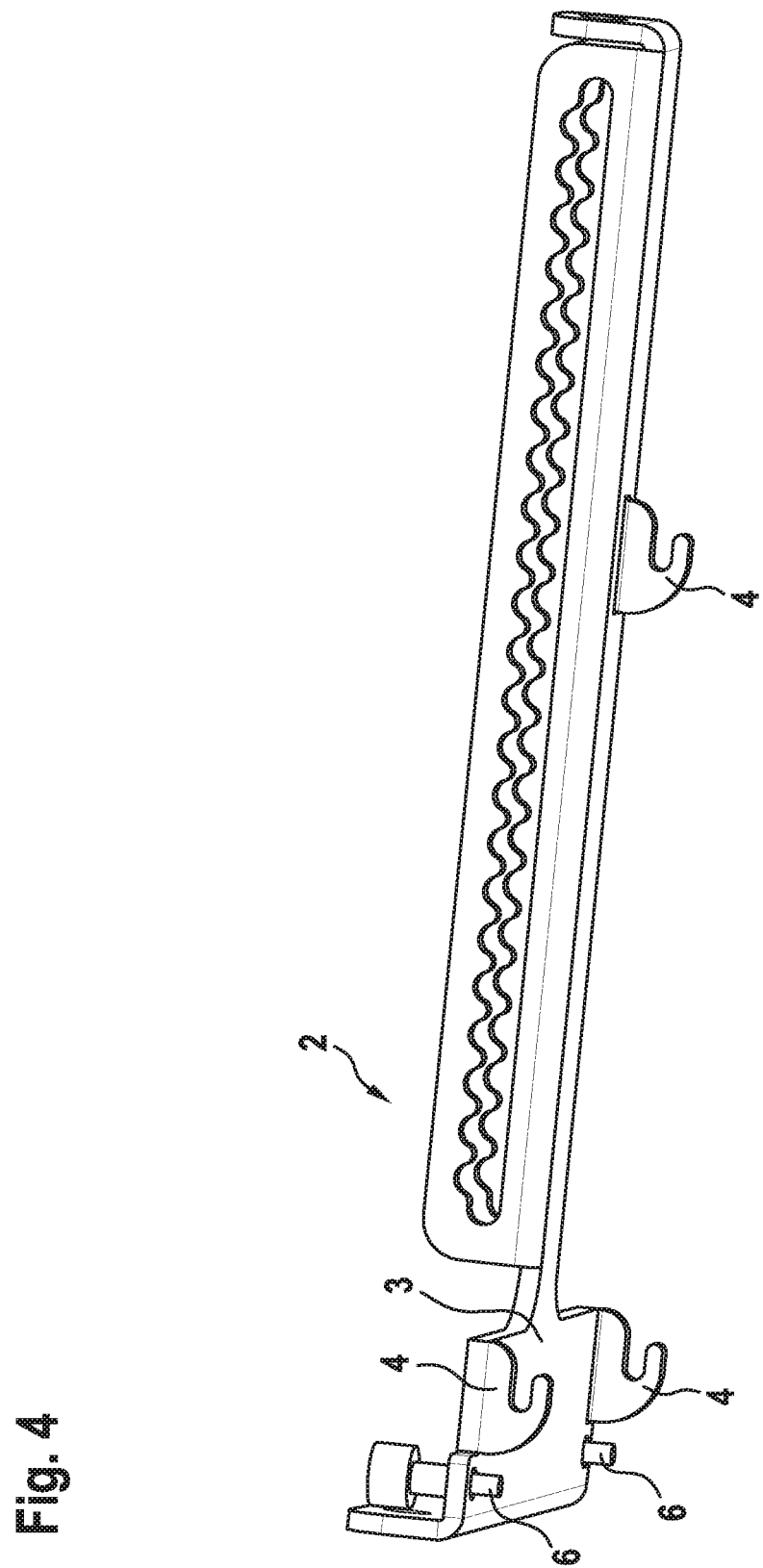

The first form-fit elements 4 are formed as hooks, as shown in FIG. 4, for example. The first form-fit elements 4 are bent sections of the metal sheet in the exemplary embodiment shown, which forms the main body 3 of the support 2.

Figure 8:
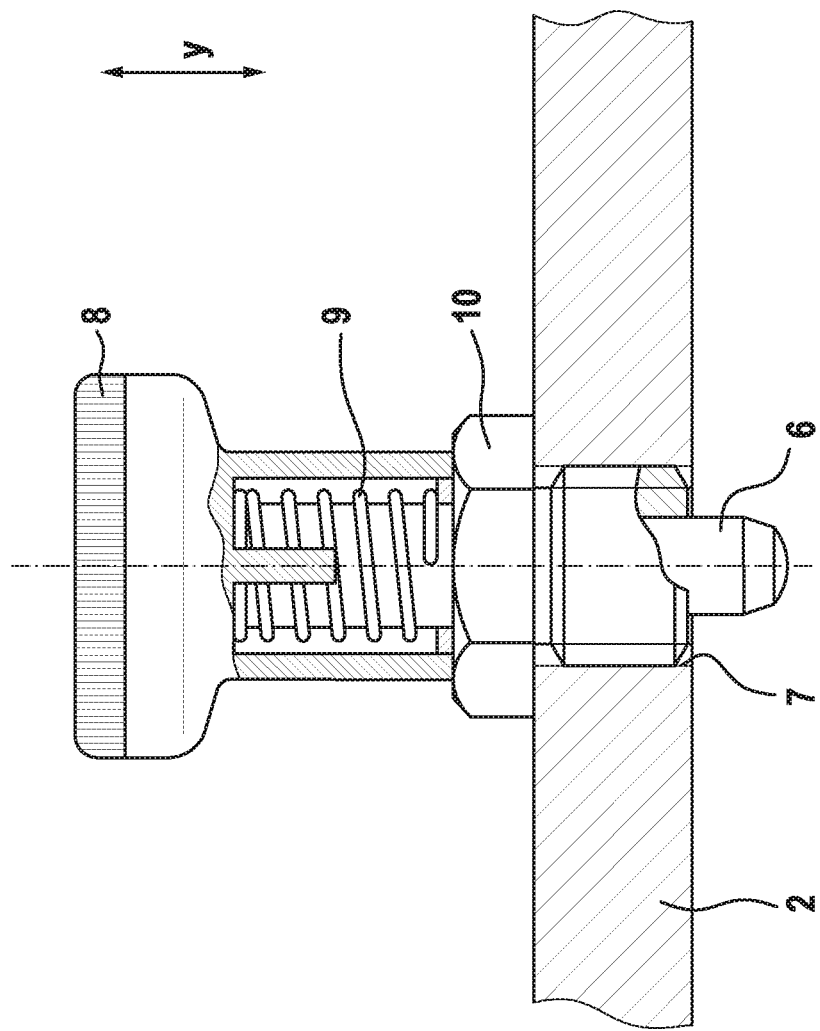
FIG. 8 shows the locking pin of the mounting system in detail.

A locking pin is directly adjacent to two of the three first form-fit elements 4. FIG. 8 shows the exemplary construction of the locking pin 6 in detail. According to FIG. 8, the locking pin 6 extends through a hole 7 in the support 2, particularly in the main body 3. The locking pin 6 is mounted to this hole 7 by means of a mounting sleeve 10. The handle 8 is at the upper end of the locking pin 6. The locking pin 6 can be pulled linearly to the Y-axis into its engaged position with this handle 8 by the user. The locking pin 6 is biased by an elastic element 9 within the mounting sleeve 10 in the direction of its disengaged position, so that the locking pin 6 is moved on its own to the engaged position shown in FIG. 8.

The enclosure 12 includes walls 14, which are forming basically the side surfaces, the backside, the bottom and the upper side of the enclosure 12. Further, the enclosure includes three inserts 13, which are embedded in the wall 14 (in this example shown in the upper side of the enclosure 12). The sectional views of FIGS. 5 and 6 show that the inserts 13 at the outer surface are flush with the walls 14.

Each of the inserts 13 forms a pocket 15. The respective pocket 15 is open at its upper side and thus in the X-Z-plane. A bolt 17 is arranged within the pocket 15. The bolt 17 extends along the Z-axis. The pocket 15 along with the bolt 17 is forming a second form-fit element 16. The pocket 15 along the X-axis further has such a length that the pocket 15 forms also a pin recess 18, into which the locking pin 6 can project.

Figure 5:
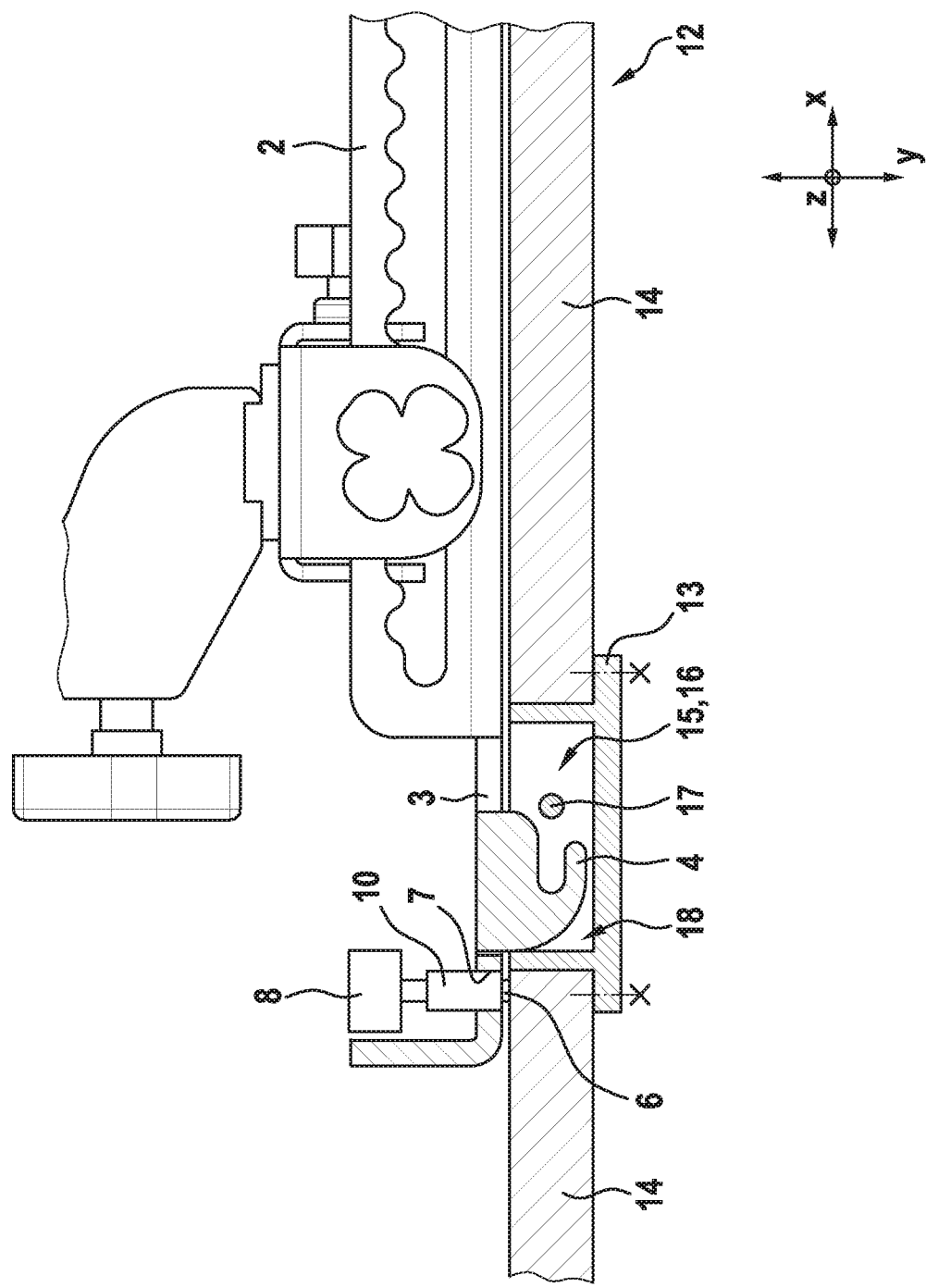
FIG. 5 shows a sectional view of the mounting system in an intermediate state according to the present invention.
Figure 6:
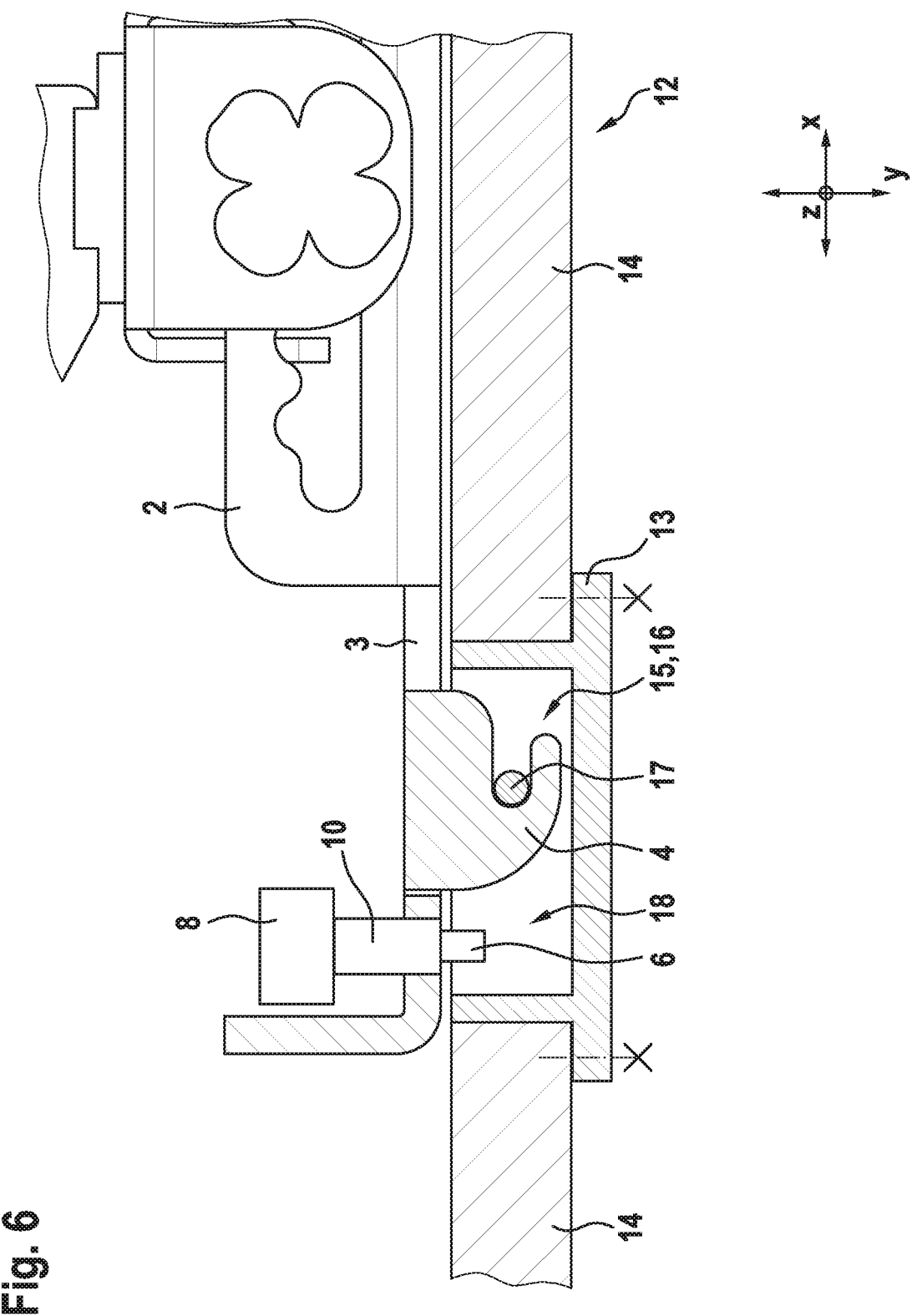
FIGS. 6-7 show sectional views of the mounting system in a locking state according to the present invention.

FIG. 5 shows an intermediate state in which the three first form-fit elements 4 are housed in the respective pockets 15, however, are not yet engaged with the second form-fit elements 16. In order to achieve this intermediate state with the connection of the support 2 to the enclosure 12, these both elements are moved towards each other along the Y-axis. With that, the three first form-fit elements 4 immerse into the pockets 15. At the same time, the locking pins 6 abut with the enclosure 12, in the example shown with the wall 14 of the upper side of the enclosure 12. Thereby, the locking pins 6 are moved into their engaged position.

A relative movement between the support 2 and the enclosure 12 along the X-axis is performed in the next step. Based on the illustration in FIG. 5, the support 2 is moved rightwards and/or the enclosure 12 is moved leftwards. Thereby, the mounting system 1 is moved to the locking state according to the FIGS. 6 and 7.

Figure 7:
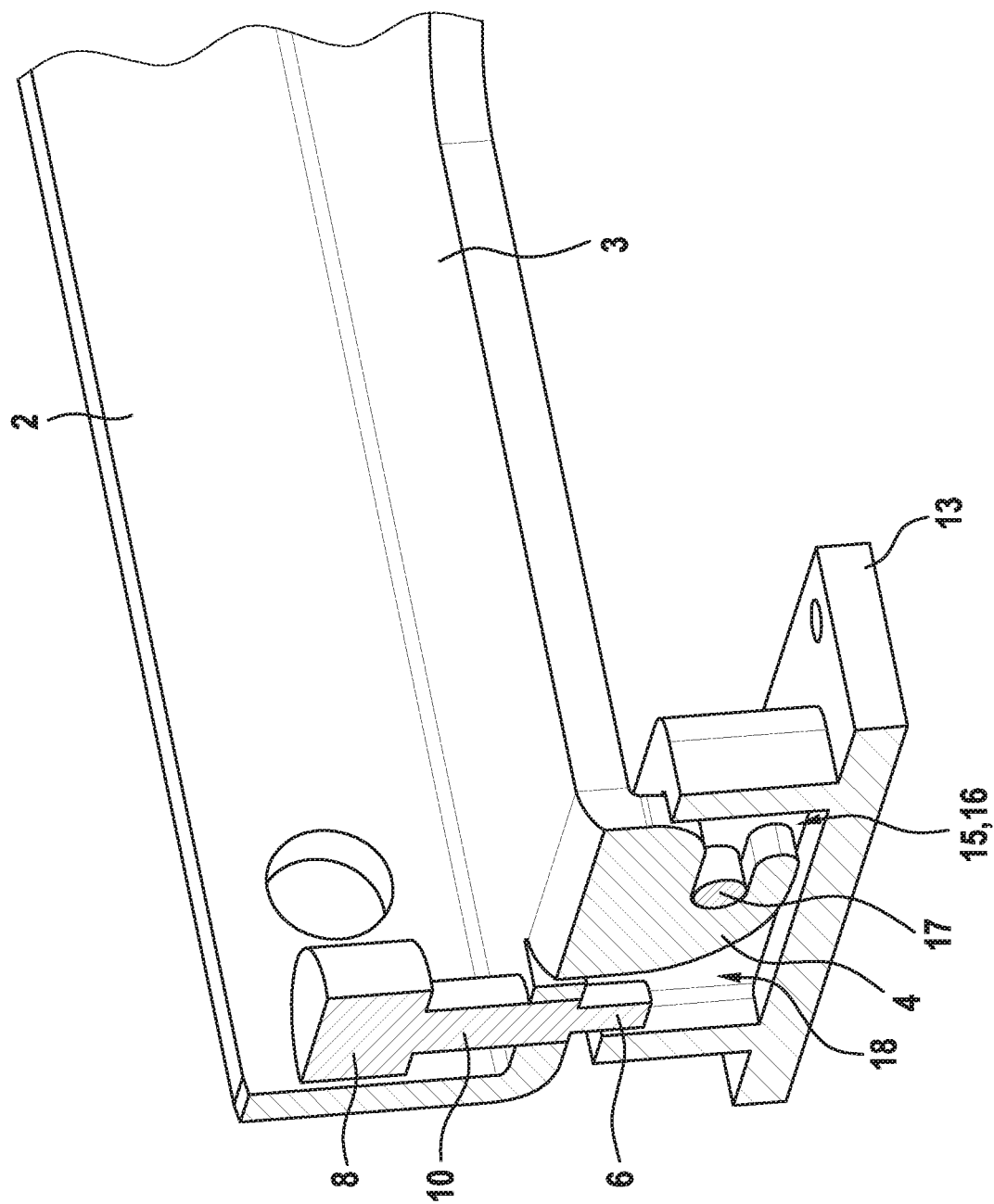

According to the FIGS. 6 and 7, the form-fit elements 4, 16 are meshing to each other in the locking state. The hook of the first form-fit element 4 surrounds the bolt 17 of the second form-fit element 16.

In order to bring the mounting system 1 from the intermediate state to the locking state, the locking pin 6 slides on the enclosure 12 up to the pin recess 18 with the relative movement of the support 2 and the enclosure 12. The locking pin 6 disengages on its own at the pin recess 18 and thereby engages into the pin recess 18. Here, the locking pin 6 blocks the relative movement between the support 2 and the enclosure 13 along the X-axis and thus a releasing of the form-fitting connection.

In addition to the above written description of the invention reference is explicitly made herein to the illustration of the invention in all figures.

REFERENCE SIGNS 1 mounting system
2 support
3 main body
4 first form-fit element
5 form-fit opening
6 locking pin
7 hole
8 handle
11 elastic element, particularly a spring
10 mounting sleeve
11 retaining device
12 enclosure, particularly a loudspeaker enclosure
13 insert
14 wall
15 pocket
16 second form-fit element
17 bolt
18 pin recess

The invention claimed is:

1. A mounting system for a loudspeaker enclosure, with an X-axis, a Y-axis and a Z-axis being defined that are respectively perpendicular to each other, comprising:
a support with a first form-fit element and a locking pin, wherein the first form-fit element is formed in a hook shape having an opening in a direction of the X-axis; and
an enclosure to be suspended with a second form-fit element and a pin recess,
wherein the two form-fit elements are insertable into each other along the X-axis for a locking state, and
wherein the locking pin engages into the pin recess in the locking state to block a relative movement between the support and the enclosure along the X-axis.

2. The mounting system according to claim 1, wherein the enclosure comprises a pocket, and wherein the second form-fit element is arranged in the pocket and/or at least is formed partly by the pocket.

3. The mounting system according to claim 2, wherein the pocket comprises a slot-shaped opening in the X-Z-plane, wherein the first form-fit element is insertable through the opening into the pocket along the Y-axis for an intermediate state, and wherein the two form-fit elements within the pocket are insertable into each other along the X-axis from the intermediate state to the locking state.

4. The mounting system according to claim 3, wherein the pin recess is formed by the pocket.

5. The mounting system according to claim 2, wherein the second form-fit element includes a bolt extending along the Z-axis in the pocket.

6. The mounting system according to claim 1, wherein the locking pin is only arranged in a linearly moveable manner at the support along the Y-axis, and is displaceable between an engaged state and a disengaged state.

7. The mounting system according to claim 6, wherein the locking pin projects through a hole in the support, and is mounted to the hole by means of a mounting sleeve.

8. The mounting system according to claim 6, including an elastic element for biasing the locking pin in the direction of its engaged state.

9. The mounting system according to claim 1, wherein the locking pin is arranged to abut with the enclosure when inserting the first form-fit element along the Y-axis and to be displaced into its engaged state along the Y-axis.

10. The mounting system according to claim 9, wherein the locking pin is arranged to slide on the enclosure along the X-axis when inserting the two form-fit elements into each other and to engage into the pin recess along the Y-axis.

11. The mounting system according to claim 1, wherein the first form-fit element is a rigid and immovable part of the support so that the first form-fit element is only moveable together with the support and the locking pin arranged thereon.

12. The mounting system according to claim 1, wherein the second form-fit element is a rigid and immovable part of the enclosure, so that the second form-fit element is only movable together with the enclosure.

13. The mounting system according to claim 1, wherein a retaining device for mounting the support to a superimposed structure is arranged to the support.

14. The mounting system according to claim 1, comprising:
a further first form-fit element and a further locking pin at the support; and
a further second form-fit element and a pin recess at the enclosure,
wherein the two further form-fit elements are insertable into each other along the X-axis for the locking state, and
wherein the further locking pin engages into the further pin recess in the locking state to block the relative movement between the support and the enclosure along the X-axis.

15. The mounting system according to claim 1, comprising:
- a further first form-fit element at the support without an allocated further locking pin; and
- a further second form-fit element at the enclosure, wherein the two further form-fit elements are insertable into each other along the X-axis for the locking state.

16. The enclosure for the use with the mounting system according to claim 1 including at least one of the second form-fit elements and at least one of the pin recesses.

17. The enclosure according to claim 16, including a wall, wherein the second form-fit element is embedded in the wall.

18. The enclosure according to claim 17, including a pocket wherein the second form-fit element is arranged within the pocket and/or is at least formed partly by the pocket, and wherein the pocket is embedded in the wall.

19. The support for the use with the mounting system according to claim 1 including at least one of the first form-fit elements and at least one of the locking pins.

20. The support according to claim 19, including a main body made of metal sheet, wherein the first form-fit element is formed by means of a bent section of the metal sheet.

\* \* \* \* \*